United States Patent
Kim et al.

(10) Patent No.: US 11,001,316 B2
(45) Date of Patent: May 11, 2021

(54) ROTARY SHIELDING TYPE WHEEL GUARD SYSTEM AND VEHICLE APPLYING THE SAME

(71) Applicants: HYUNDAI MOTOR COMPANY, Seoul (KR); KIA MOTORS CORPORATION, Seoul (KR)

(72) Inventors: Un-Tae Kim, Gwangmyeong-si (KR); Hak-Lim Kim, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 53 days.

(21) Appl. No.: 16/435,667

(22) Filed: Jun. 10, 2019

(65) Prior Publication Data

US 2020/0130756 A1    Apr. 30, 2020

(30) Foreign Application Priority Data

Oct. 29, 2018    (KR) ................. 10-2018-0129716

(51) Int. Cl.
| | |
|---|---|
| *B62D 35/00* | (2006.01) |
| *B62D 35/02* | (2006.01) |
| *B62D 37/02* | (2006.01) |
| *B62D 25/16* | (2006.01) |

(52) U.S. Cl.
CPC ............ *B62D 37/02* (2013.01); *B62D 25/16* (2013.01); *B62D 35/005* (2013.01); *B62D 35/02* (2013.01)

(58) Field of Classification Search
CPC ...... B62D 35/005; B62D 35/02; B62D 37/02; B62D 25/16

USPC ................... 296/180.1, 180.5, 198
See application file for complete search history.

(56) References Cited

U.S. PATENT DOCUMENTS

| | | | | |
|---|---|---|---|---|
| 6,494,473 | B1* | 12/2002 | Baghboian | B60R 19/00 280/160 |
| 7,681,942 | B2* | 3/2010 | Van Der Westhuizen | B62J 17/02 296/180.5 |
| 8,979,102 | B1* | 3/2015 | Prentice | B62D 25/163 280/124.1 |
| 2008/0315622 | A1* | 12/2008 | Oda | B62D 35/02 296/180.1 |
| 2010/0244425 | A1* | 9/2010 | Connett | B62D 25/18 280/848 |
| 2014/0375081 | A1* | 12/2014 | Kuriyama | B62D 25/082 296/187.1 |
| 2015/0307137 | A1* | 10/2015 | Kishima | B62D 25/18 280/848 |
| 2016/0137236 | A1* | 5/2016 | Yoon | B62D 25/16 296/180.5 |
| 2017/0355333 | A1* | 12/2017 | Kishima | B62D 35/005 |
| 2018/0154952 | A1* | 6/2018 | Klop | B62D 35/005 |

(Continued)

FOREIGN PATENT DOCUMENTS

JP        2013-193546 A        9/2013

*Primary Examiner* — Gregory A Blankenship
(74) *Attorney, Agent, or Firm* — Brinks Gilson & Lione (57) ABSTRACT

A wheel guard system may include a wheel guard located on an upper portion of a tire; and a deflector to be folded to enter into and to be built in the wheel guard. The deflector may be unfolded to get out of the wheel guard and form tire alignment for shielding a whole tire width. In particular, the deflector is provided with a speed rib rotated by a motor, and the motor may fold or unfold the speed rib in a rotation direction of the motor.

20 Claims, 6 Drawing Sheets

(56) References Cited

U.S. PATENT DOCUMENTS

| | | | | |
|---|---|---|---|---|
| 2018/0290535 A1* | 10/2018 | McMillan | ............ | B62D 35/005 |
| 2018/0339734 A1* | 11/2018 | Williams | ............. | B62D 35/008 |
| 2019/0002038 A1* | 1/2019 | Kim | ..................... | B62D 35/008 |
| 2019/0011887 A1* | 1/2019 | Mallet | .................. | G04B 17/045 |
| 2019/0168826 A1* | 6/2019 | Wolf | ....................... | B62D 37/02 |
| 2019/0210657 A1* | 7/2019 | Gandhi | .................. | B62D 37/02 |
| 2019/0233025 A1* | 8/2019 | Mitidieri | ................. | B62D 35/02 |
| 2020/0010128 A1* | 1/2020 | Herlem | .................. | B62D 37/02 |
| 2020/0102026 A1* | 4/2020 | Nishida | .................. | B62D 35/02 |
| 2020/0130756 A1* | 4/2020 | Kim | ..................... | B62D 25/16 |
| 2020/0172058 A1* | 6/2020 | Demetrio | ............... | B62D 35/02 |
| 2020/0239087 A1* | 7/2020 | Nakamura | ............ | B62D 35/02 |

* cited by examiner

ROTARY SHIELDING TYPE WHEEL GUARD SYSTEM AND VEHICLE APPLYING THE SAME

CROSS-REFERENCE TO RELATED APPLICATION

This application claims priority to and the benefit of Korean Patent Application No. 10-2018-0129716, filed on Oct. 29, 2018, the entire contents of which are incorporated herein by reference.

FIELD

Exemplary forms of the present disclosure relate to a wheel guard, and particularly, to a vehicle applying a rotary shielding type wheel guard system.

BACKGROUND

The statements in this section merely provide background information related to the present disclosure and may not constitute prior art.

Recently, demand for improved fuel economy of a vehicle to cope with exhaust gas regulations that are gradually strengthened has been more intensified, and as countermeasures for this, attempts to improve aerodynamic characteristics (e.g., vehicle drag) of the vehicle have been regarded as more important.

Through this, technology to further heighten the fuel economy improvement rate has been strengthened through improvement of a vehicle underbody design in addition to a streamlined external design. This is because the resistance of the underbody and wheel/tire portion holds about 45% of the resistance of an upper part of a vehicle on the assumption that the whole vehicle drag is set to 100%.

As an example, an underbody aerodynamic improvement device includes a basic normal device, such as bumper rib, air dam, or wheel deflector, as an aerodynamic item for seeking flow improvement of the underbody and tire portion, and has been further developed as an active device capable of performing size adjustment as an aerodynamic item for solving restrictions of the normal body.

In particular, a size adjustment type underbody aerodynamic improvement device can change its shape to suit road conditions, and thus it is possible to heighten application of ground clearance specifications of the vehicle and to prevent interference problems that may occur on the bumper rib, air dam, or wheel deflector during driving on a speed bump or an uneven road.

Accordingly, since the underbody aerodynamic improvement device is applied to the vehicle as the normal device or the active device, the fuel efficiency can be improved by reducing the resistance of the underbody and wheel/tire portion which accounts for about 45% of the whole vehicle drag.

However, we have discovered that although the active device of the underbody aerodynamic improvement device has the advantages of providing size variations as compared with the size fixing type normal device, the size change of the active device is limited to in a vertical direction (i.e., ground clearance adjustment direction or vehicle height direction).

In addition, we have found that the vertical adjustment type active device has the drawbacks in that it is difficult to sufficiently secure the tire alignment with respect to a bumper having an enlarged side-surface curvature in bumper design (i.e., bumper side curvature), and such insufficient tire alignment undermines the aerodynamic effect for the underbody and wheel/tire portion.

SUMMARY

Exemplary forms of the present disclosure provide a rotary shielding type wheel guard system and a vehicle applying the same, which maintain and improve the aerodynamic effect for the underbody and wheel/tire portion by securing tire alignment through radial folding and unfolding, and do not restrict the degree of freedom of bumper design by variably controlling the radial folding and unfolding portion to suit a bumper side curvature size.

In one form of the present disclosure, a wheel guard system includes a wheel guard; and a deflector configured to be folded to enter into and to be built in the wheel guard and to be unfolded to get out of the wheel guard and to form tire alignment for shielding a whole tire width As one form, the folding and unfolding of the deflector correspond to rotations in opposite directions.

In one form, the wheel guard is provided with a flap protector, and the flap protector is configured to form a space in which the deflector is folded.

As another form, the deflector is provided with a speed rib rotated by a motor, and the motor is configured to fold or unfold the speed rib in a rotation direction.

In still another form, the speed rib is composed of a first fan-shaped flap configured to move by a rotation force transferred from the motor and a second fan-shaped flap configured to move to the first flap, and a shape of the first flap and the second flap is changed from a fan shape to a semicircular shape having a size enough to shield the whole tire width by folding and unfolding the speed rib.

In other form, the first flap is provided with a flap projection projecting from the first flap, and the second flap is provided with a flap groove caved to form a movement path of the flap projection. The movement path has the same radius as a rotation radius of the first flap, and the second flap moves together with the first flap along the movement path.

In still other form, the deflector is provided with a dust cover for shielding an inlet portion of the wheel guard, and the dust cover is coupled to the wheel guard by a spring hinge. The dust cover is configured to open the inlet portion in case where the spring hinge is flipped by a pressing force applied by the speed rib during the unfolding, whereas the dust cover is configured to close the inlet portion by a spring restoring force of a spring applied to the spring hinge during the folding.

In one aspect of the present disclosure, a flap guide projecting along the inlet portion is provided on the inlet portion of the wheel guard, and the flap guide is configured to form the spring hinge so that the dust cover is coupled thereto.

In one aspect of the present disclosure, the deflector is associated with a controller, and control modes of the controller include: an initial mode in which the deflector is in a folding state, a high-speed mode in which the deflector is in a full unfolding state, and a low-speed mode in which the deflector is in a half unfolding state.

In accordance with another form of the present disclosure, a vehicle includes a wheel guard system including: a wheel guard located on an upper portion of a tire of the vehicle, a speed rib configured to be folded in a fan shape by folding in a rotation direction of a motor and to be built in the wheel guard, and configured to be unfolded in a semicircular shape by unfolding and to get out of the wheel guard, and a dust cover configured to shield an inlet portion of the wheel guard. The vehicle further comprises a bumper configured to shield a partial portion of the tire with left and right bumper side curvatures.

In another form, the wheel guard system is associated with an engine electronic control unit (ECU), and the engine ECU is configured to control the folding and unfolding of the speed rib in the rotation direction of the motor.

In still another form, the engine ECU is configured to control the folding and unfolding of the speed rib based on an initial mode, a low-speed mode, and a high-speed mode. The initial mode, the low-speed mode, and the high-speed mode are determined by a speed of the vehicle. The speed rib is built in the wheel guard in a folding state in the initial mode, the speed rib is configured to get out of the wheel guard in a half unfolding state by shielding a half width of the tire in the low-speed mode, and the speed rib is configured to get out of the wheel guard in a full unfolding state by shielding a whole width of the tire in the high-speed mode.

Since the wheel guard applied to the vehicle according to the present disclosure is configured by the rotary shielding type system, it implements the following operations and effects.

First is the improvement of the aerodynamic performance. Since the length adjustment in the vertical/horizontal direction is possible by the radial folding and unfolding of the speed rib built in the wheel guard, the aerodynamic improvement effect for the underbody and wheel/tire portion can be improved by 20% or more as compared with the existing speed rib unfolding scheme in the vertical direction. Second is the fuel economy improvement. Since the aerodynamic characteristics of the vehicle are improved through the drag improvement by 20% or more, the fuel economy improvement by about 8% or more can be proved through the normal-speed fuel economy improvement by 4% or more per drag improvement by 10%. Third is the improvement of the degree of freedom of bumper design. The radial unfolding portion of the speed rib built in the wheel guard can be variably controlled to suit the bumper side curvature size.

It is to be understood that both the foregoing general description and the following detailed description of the present disclosure are exemplary and explanatory and are intended to provide further explanation of the disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Since exemplary forms can be implemented in various different types by those of ordinary skill in the art to which the present disclosure pertains, the present disclosure is not limited to the form described hereinafter.

Figure 1:
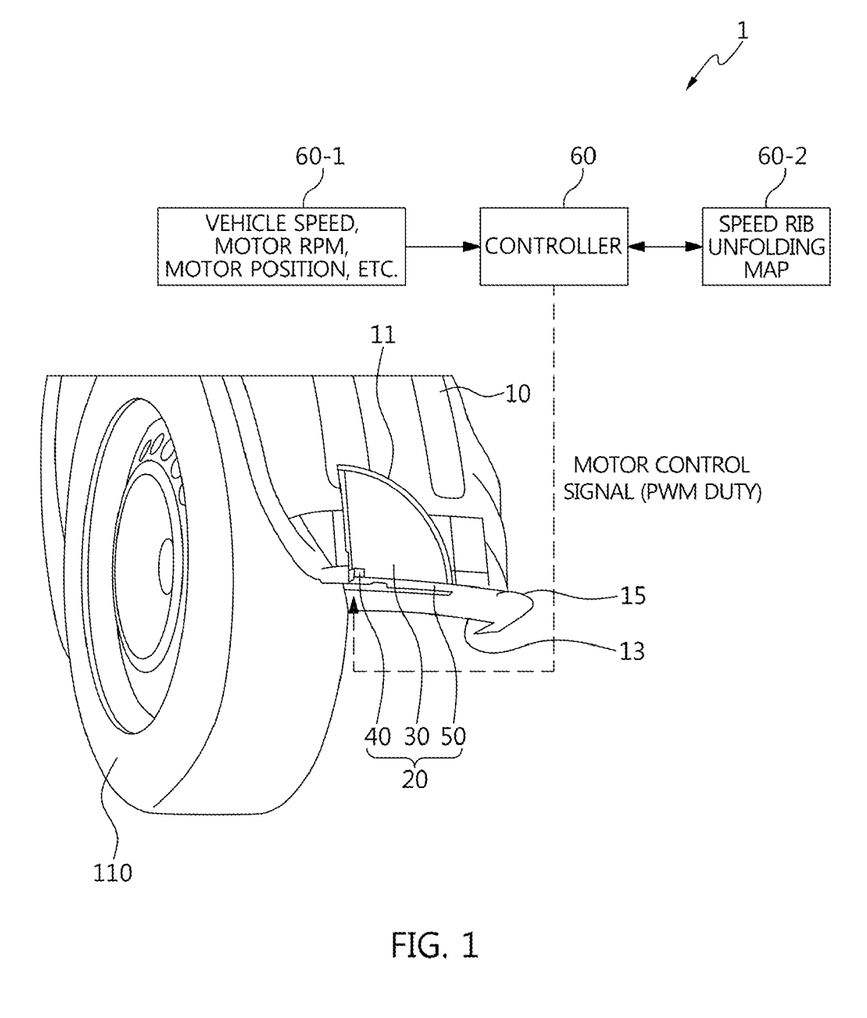
FIG. 1 is a diagram illustrating the configuration of a rotary shielding type wheel guard system according to one form of the present disclosure.

Referring to FIG. 1, a rotary shielding type wheel guard system 1 includes: a wheel guard 10 spaced apart from an upper end portion of a tire 110 and configured to shield the width of the tire 110, a deflector 20 configured to shield a partial portion of the tire 110 in a width direction of the tire 110, and a controller 60 configured to control the deflector 20 to suit a vehicle speed.

As an example, the wheel guard 10 is configured to include a flap protector 11, a cover flange 13, and a flap guide 15. The flap protector 11 forms a built-in space, in which the deflector 20 is accommodated, in a front portion of the tire 110 (i.e., portion from which the tire 110 is exposed in a driving direction of a vehicle). In particular, the built-in space is composed of a recessed surface which is surrounded by a girth and is in a fan shape of 90° corresponding to a ¼ portion of a circle of 360°.

The cover flange 13 forms an extended portion of the flap protector 11 to guide folding of the deflector 20. The flap guide 15 projects from the flap protector 11 to form an inlet portion of the flap protector 11 enabling the deflector 20 to operate. In particular, the flap guide 15 has a structure in which its middle portion is curved with a slight curvature or a straight-line structure along the length direction thereof.

As an example, the deflector 20 is composed of a speed rib 30, a motor 40, and a dust cover 50. The speed rib 30 in a state where it is folded in a fan shape of 90° is unfolded in a semicircle shape of 180° to shield the width of the tire 110 in a front portion of the tire 110 (i.e., portion from which the tire 110 is exposed in the driving direction of the vehicle). The motor 40 performs forward/reverse rotation to operate the speed rib 30.

The dust cover 50 is coupled to the flap guide 15 of the wheel guard 10, and if the speed rib 30 is unfolded, it is pushed out by an unfolding force of the speed rib 30 to open the inlet portion of the flap protector 11, whereas if the speed rib 30 is folded, it closes the inlet portion by a spring restoring force. Accordingly, the dust cover 50 can also prevent the speed rib 30 from being damaged due to foreign substances (e.g., stone pieces or object fragments) jumping up to the tire 110.

As an example, the controller 60 controls forward/reverse rotation of the motor 40 to divide the unfolding angle of the speed rib 30 into 90° and 180°, and outputs an ON/OFF signal or a pulse width modulation duty (PWM duty) signal.

For this, the controller 60 is provided with a data inputter 60-1 and a speed rib unfolding map 60-2. The data inputter 60-1 detects and provides a vehicle speed, a motor RPM, and a motor position to the controller as input data. The speed rib unfolding map 60-2 provides, to the controller 60, an initial mode, a low-speed mode, and a high-speed mode based on the input data of the data inputter 60-1 so that the opening and closing operation of the speed rib 30 can be diversified/sub-divided.

The speed rib unfolding map 60-2 sets and provides, to the controller 60, an unfolding speed in accordance with the specification of the speed rib 30, and thus a current supply time for forward/reverse rotation of the motor 40 in the low-speed mode and the high-speed mode can be determined.

In particular, the controller 60 is connected to the motor 40 in the space of the flap protector 11 of the wheel guard 10 to be united with the wheel guard 10, or is located in a separated place (e.g., certain place of the vehicle 100) of the wheel guard 10 to be connected to the motor 40 through a signal line.

Figure 2:
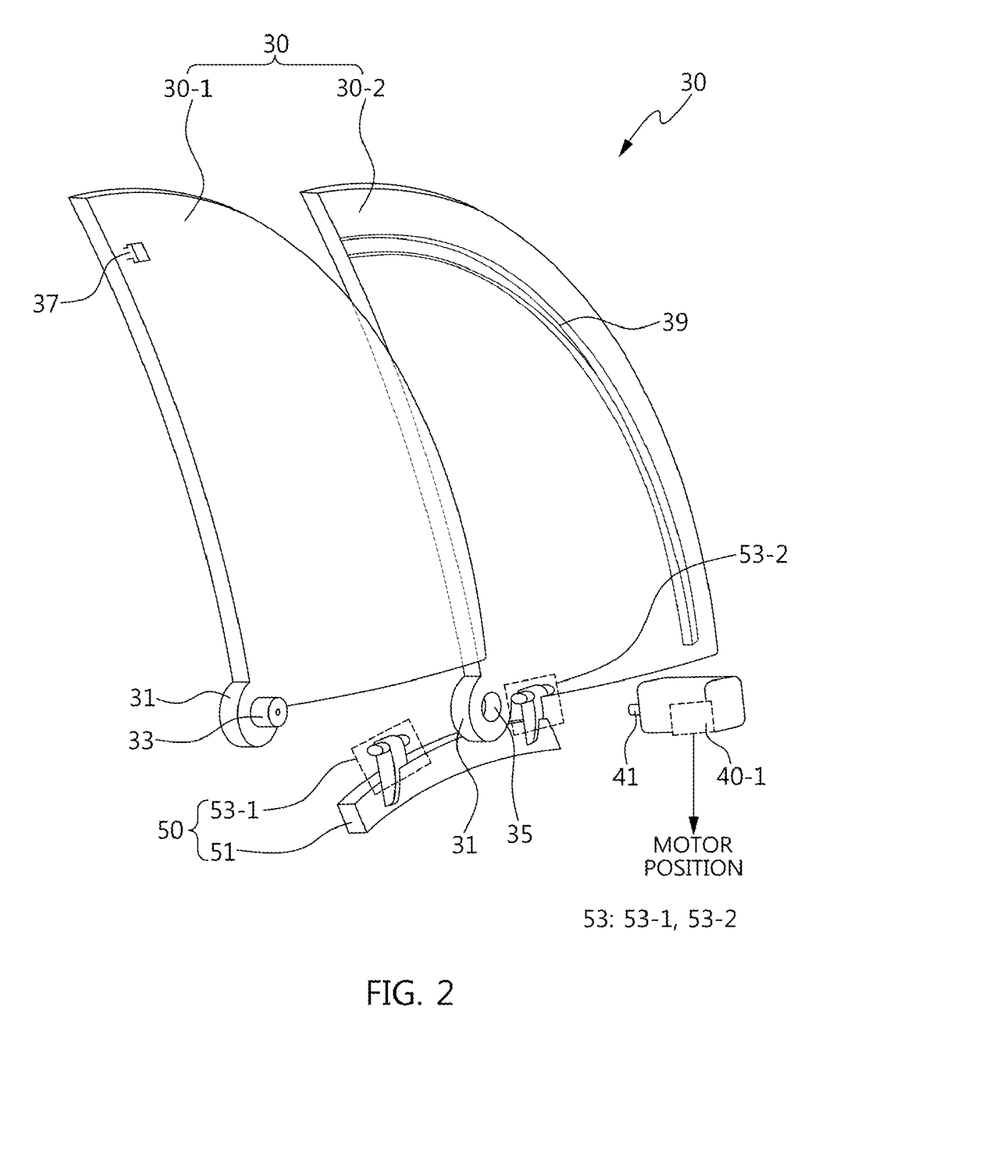
FIG. 2 is a diagram illustrating the exploded configuration of a deflector applied to a rotary shielding type wheel guard system according to one form of the present disclosure.

FIG. 2 is a diagram illustrating the exploded configuration of a deflector 20 including a speed rib 30, a motor 40, and a dust cover 50.

Specifically, the speed rib 30 is composed of a pair of a first flap 30-1 in a fan shape of 90° and a second flap 30-2 in a fan shape of 90°. In particular, if the first flap 30-1 and the second flap 30-2 are folded, the first flap 30-1 is piled on the second flap 30-2 or the second flap 30-2 is piled on the first flap 30-1, whereas if the first flap 30-1 and the second flap 30-2 are unfolded, the first flap 30-1 is unfolded from the second flap 30-2 or the second flap 30-2 is unfolded from the first flap 30-1.

As an example, the first flap 30-1 includes a flat body in a fan shape of 90°, and a connection boss 31, a shaft hole projection 33, and a flap projection 37 are formed on the flat body. The connection boss 31 is formed in a circular shape at an inside portion (i.e., center portion in a fan shape of 90°) of the flat body. The shaft hole projection 33 projects from one side surface of the connection boss 31 with a relatively small diameter and a specific length. The flap projection 37 projects from an outside portion (i.e., outer portion in a fan shape of 90°) of the flat body to one side surface of the flat body with a specific size.

In particular, the shaft hole projection 33 is connected to a motor shaft 41 of the motor 40 to move the first flap 30-1 by a forward/reverse rotation force transferred from the motor 40.

As an example, the second flap 30-2 includes a flat body in a fan shape of 90°, and a connection boss 31, a shaft hole 35, and a flap groove 39 are formed on the flat body. The connection boss 31 is formed in a circular shape at an inside portion (i.e., center portion in a fan shape of 90°) of the flat body. The shaft hole 35 is formed on the connection boss 31, and the shaft hole projection 33 is inserted into the shaft hole 35 in a free rotation state. The flap groove 39 is formed on one side surface of the flat body from an outside portion (i.e., outer portion in a fan shape of 90°) of the flat body with a width for inserting the flap projection 37, and thus has a shape that coincides with the rotation radius of the first flap 30-1.

In this case, the flap groove 39 forms a movement path of the flap projection 37, and thus the second flap 30-2 can move to be unfolded together with the movement of the first flap 30-1 at a longitudinal position of the movement path.

In particular, the flap projection 37 and the flap groove 39 have various shapes to form an uneven (凹凸) structure to be fitted to each other. However, since the flap projection 37 is a cuboidal projection and the flap groove 39 is formed in an open type rectangular shape (i.e., roughly "U" shape). In one form, the flap projection 37 and the flap groove 39 are fitted to each other with a depth enough to inhibit or prevent secession or separation thereof due to external vibration.

Accordingly, the speed rib 30 maintains a fan shape by folding of the first flap 30-1 and the second flap 30-2, and the shape of the speed rib 30 is changed from a fan shape to a semicircular shape by radial unfolding of the first flap 30-1 and the second flap 30-2.

Specifically, the motor 40 is provided with a motor shaft 41 connected to an end portion of the speed rib 30. Accordingly, the first and second flaps 30-1 and 30-2 of the speed rib 30 are unfolded by the forward rotation of the motor shaft 41, and are folded by the reverse rotation of the motor shaft 41. Further, the motor 40 has a built-in motor sensor 40-1, and the motor sensor 40-1 detects and provides motor RPM or motor position to the data inputter 60-1.

In particular, any motor type can be applied. In one form, it may be a step motor.

Specifically, the dust cover 50 is composed of an opening/closing body 51 and a spring hinge 53. The opening/closing body 51 has a structure in which its middle portion is curved with a slight curvature or a straight-line structure along the length direction thereof. The spring hinge 53 includes a pair of a left spring hinge 53-1 coupled to the flap guide 15 of the wheel guard 10 in the left section of the opening/closing body 51 and a right spring hinge 53-2 coupled to the flap guide 15 of the wheel guard 10 in the right section thereof.

In particular, the left spring hinge 53-1 and the right spring hinge 53-2 always apply a spring restoring force to the opening/closing body 51 to block the inlet portion of the flap protector 11 of the wheel guard 10.

Figure 3:
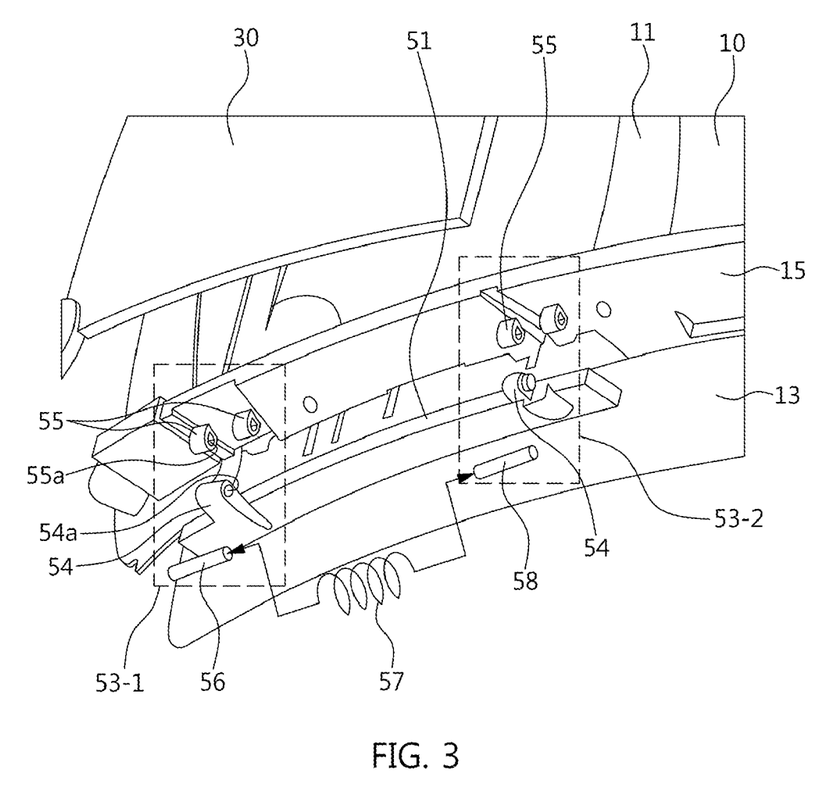
FIG. 3 is a diagram illustrating the coupling structure of first and second flaps of a speed rib according to one form of the present disclosure.

Referring to FIG. 3, the opening/closing body 51 matches a curved structure of the flap guide 15 of the wheel guard 10 using the curved structure thereof. Accordingly, the dust cover 50 further improves the blocking function with respect to the inlet portion of the wheel protector 11 that is closed by a spring restoring force of a spring 57 through a curvature structure.

Referring to FIG. 3, the left spring hinge 53-1 and the right spring hinge 53-2 have the same structure, and each of the left spring hinge 53-1 and the right spring hinge 53-2 is composed of a cramp 54, a hinge 55, a pin 56, and a spring 57. The cramp 54 is a projection boss penetrating a pin hole 54a and is formed on the opening/closing body 51. The hinge 55 is a projection boss penetrating a pin hole 55a at an interval for inserting the cramp 54 therein, and is formed on the flap guide 15.

The pin 56 penetrates the pin hole 54a of the cramp 54 and the pin hole 55a of the hinge 55, and operates so that the cramp 54 is rotated against the pin hole 54a. The spring is coupled to the pin 56, and always applies the spring restoring force to the opening/closing body 51.

In particular, although various springs can be applied as the spring 57, it is formable to apply a torsion spring.

Figure 4:
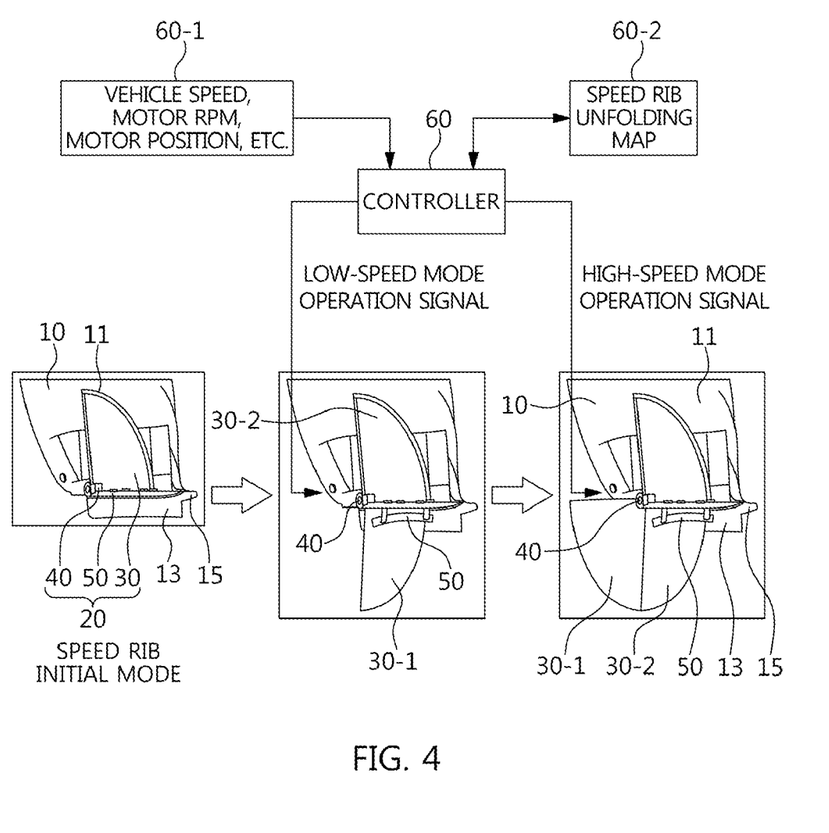
FIG. 4 is a diagram illustrating the operation state of a rotary shielding type wheel guard system being successively changed from an initial mode to a low-speed mode and a high-speed mode according to one form of the present disclosure.
Figure 5:
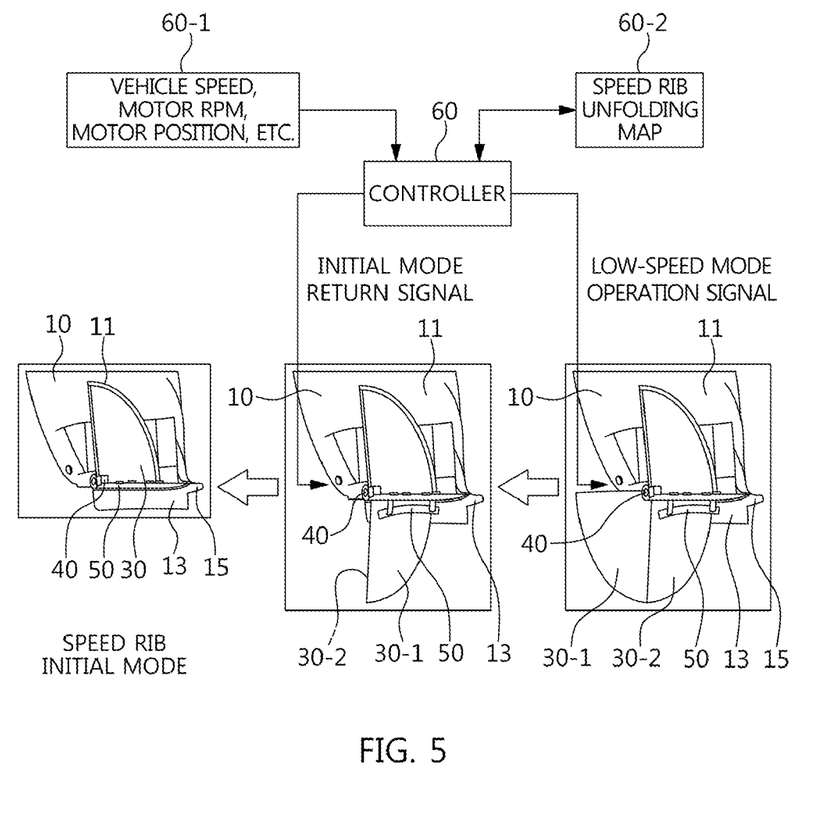
FIG. 5 is a diagram illustrating the operation state of a rotary shielding type wheel guard system being successively changed from a high-speed mode to a low-speed mode and an initial mode according to one form of the present disclosure.

FIGS. 4 and 5 exemplify an operation mode of the rotary shielding type wheel guard system 1. In this case, the operation mode is classified into an initial mode, a low-speed mode, and a high-speed mode based on the vehicle speed.

Referring to FIG. 4, the initial mode is a mode in which the speed rib 30 is built in the flap protector 11 of the wheel guard 10, and thus the controller 60 does not output a control signal in a state where the deflector 20 does not operate. In this case, the controller 60 maintains the initial mode at a vehicle speed that is less than 80 kph.

In contrast, in the low-speed mode, the controller 60 outputs a low-speed mode operation signal to the motor 40 as the control signal, and the motor 40 is rotated (i.e., forward rotation). Then, the first flap 30-1 of the speed rib 30 moves by the rotation force of the motor 40 transferred through the motor shaft 41, and the movement is performed in a state where the flap projection 37 of the first flap 30-1 is inserted into the flap groove 39.

Accordingly, the flap projection 37 of the first flap 30-1 pushes the opening/closing body 51 of the dust cover 50 in a process in which the flap projection 37 moves along a path from an upper end position (i.e., initial position) of the flap groove 39 to an end position (i.e., longitudinal position). Through this, the first flap 30-1 overcomes the spring force of the spring 57 applied to the opening/closing body 51 by the rotation force of the motor 40, and pushes the opening/closing body 51, so that the inlet portion of the flap protector 11 is opened, and the first flap 30-1 gets out of the flap protector 11.

As a result, since the flap projection 37 of the first flap 30-1 is rotated by 180° and descends to the end position (i.e., longitudinal position) of the flap groove 39 of the second flap 30-2, the first flap 30-1 shields a half portion of the width of the tire 110 in a front portion of the tire 110 (i.e., portion from which the tire 110 is exposed in a driving direction of the vehicle). In this case, the controller 60 controls to stop the motor 40 in a state where the first flap 30-1 is fully rotated by 90°, and thus the second flap 30-2 maintains the state where it is built in the flap protector 11 of the wheel guard 10.

As described above, the partial shielding of the front portion of the tire 110 by the first flap 30-1 in the low-speed mode reduces the resistance of the underbody and wheel/tire portion. In this case, the controller 60 converts the initial mode into the low-speed mode at a vehicle speed equal to or higher than 80 kph and equal to or lower than 100 kph.

Then, in the high-speed mode, the controller 60 outputs a high-speed mode operation signal to the motor 40 as a control signal, and the motor 40 is rotated. Accordingly, the flap projection 37 of the first flap 30-1 presses the end portion of the flap groove 39 by the rotation force of the motor 40, and the pressing force at the end portion of the flap groove 39 causes the second flap 30-2 to move.

As a result, since the first flap 30-1 is further rotted by 90° and descends by 270° and the second flap 30-2 descends by 180° at the same time, the unfolding shape of the first flap 30-1 and the second flap 30-2 causes the whole portion of the width of the tire 110 to be shielded in a front portion of the tire 110 (i.e., portion from which the tire 110 is exposed in a driving direction of the vehicle).

As described above, the whole shielding of the front portion of the tire 110 by the first flap 30-1 and the second flap 30-2 in the high-speed mode greatly reduces the resistance of the underbody and wheel/tire portion. In this case, the controller 60 converts the low-speed mode into the high-speed mode at a vehicle speed equal to or higher than 100 kph.

Referring to FIG. 5, in the high-speed mode, under the control of the controller 60 with respect to the motor 40, the whole portion of the width of the tire 110 is shielded in the front portion of the tire 110 (i.e., portion from which the tire 110 is exposed in the driving direction of the vehicle) by the rotation of the first flap 30-1 by 270° and the rotation of the second flap 30-2 by 180°.

Then, in the low-speed mode, under the control of the controller 60, the motor 40 is rotated (i.e., reverse rotation), and the flap projection 37 of the first flap 30-1 is rotated by 90° to ascend from the end portion (i.e., longitudinal position) of the flap groove 39 up to the upper end position (i.e., initial position). Accordingly, the first flap 30-1 is piled on the second flap 30-2, and the first and second flaps 30-1 and 30-2 overlapping each other shield a half portion of the width of the tire 110 in the front portion of the tire 110 (i.e., portion from which the tire 110 is exposed in the driving direction of the vehicle).

Thereafter, in the initial mode, under the control of the controller 60, the motor 40 is further rotated (i.e., reverse rotation), and the flap projection 37 of the first flap 30-1 moves to push up the second flap 30-2 in the upper end position (i.e., initial position) of the flap groove 39. Accordingly, the second flap 30-2 enters into the flap protector 11 together with the first flap 30-1, and thus the first and second flaps 30-1 and 30-2 are all removed in the front portion of the tire 110 (i.e., portion from which the tire 110 is exposed in the driving direction of the vehicle).

In this state, since the controller 60 does not output a control signal to the motor 40, the speed rib 30 is built in the flap protector 11 of the wheel guard 10, and the deflector 20 is converted to a non-operation state.

Figure 6:
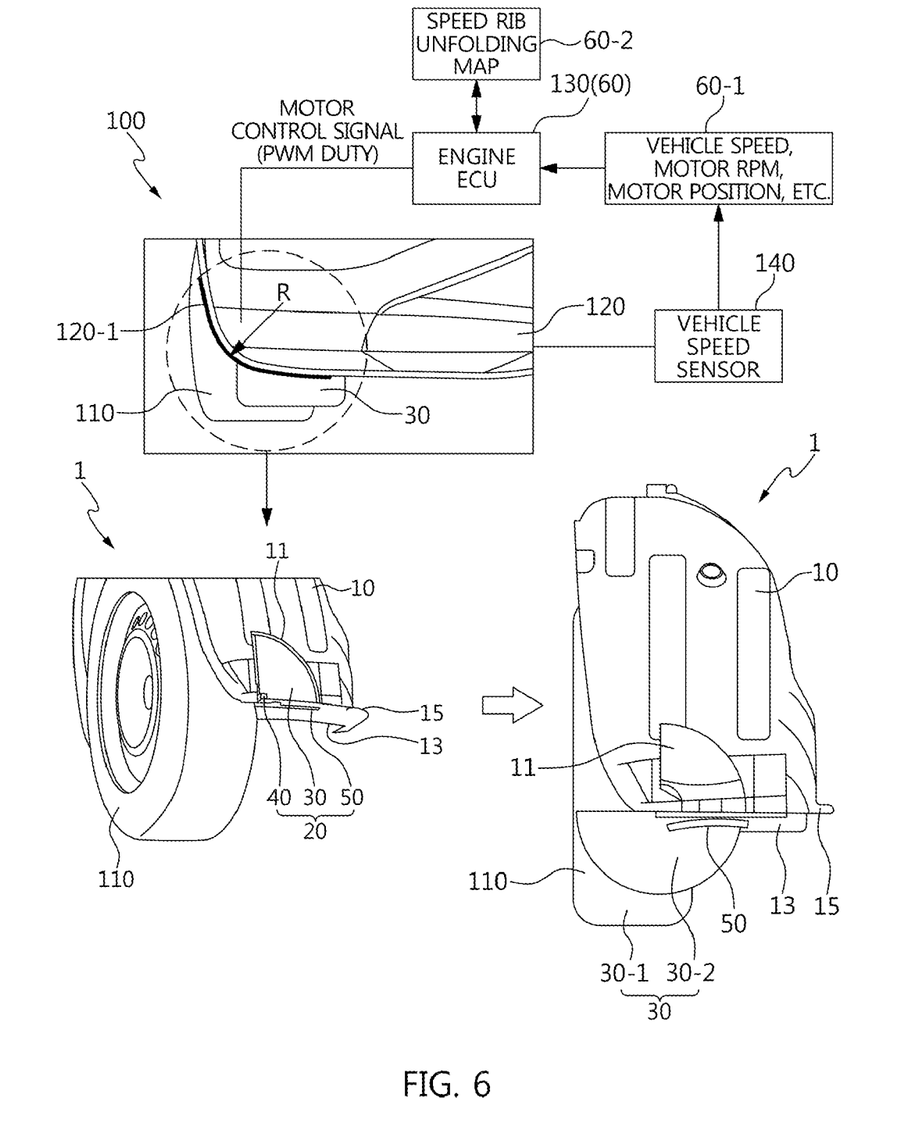
FIG. 6 is a diagram illustrating an example of a vehicle applying a rotary shielding type wheel guard system according to one form of the present disclosure.

FIG. 6 is a diagram illustrating an example of a vehicle 100 applying a rotary shielding type wheel guard system 1 according to the present disclosure.

As illustrated, the vehicle 100 includes a wheel guard system 1 provided at an interval on an upper end portion of a tire 100 and configured to shield a partial portion in front of the tire, a bumper 120 located in front of the vehicle 100, an engine electronic control unit (ECU) 130, and a vehicle speed sensor 140.

Specifically, the wheel guard system 1 is equal to the rotary shielding type wheel guard system 1 as described above through FIGS. 1 to 5. The bumper 120 is a bumper having an enlarged side-surface curvature in bumper design by forming, on left and right sides, a bumper side curvature 120-1 capable of almost shielding the whole width of the left and right-side tires in a front direction of the vehicle. The engine ECU 130 controls the motor 40 of the wheel guard system 1 together with the engine (not illustrated) of the vehicle 100. The vehicle speed sensor 140 detects the driving speed of the vehicle 100 as a vehicle speed and provides the detected driving speed to the engine ECU 130.

Accordingly, the wheel guard system 1 is different from the rotary shielding type wheel guard system 1 on the point that the controller 60 can be replaced by the engine ECU 130, the data inputter 60-1 can provide the vehicle speed detected by the vehicle speed sensor 140 to the controller 60 as input data, and the speed rib unfolding map 60-2 can be replaced by a memory of the engine ECU 130.

Accordingly, the engine ECU 130 controls the operation of the wheel guard system 1 in a state where the operation mode is classified into the initial mode, the low-speed mode, and the high-speed mode as described above with reference to FIGS. 4 and 5.

As an example, the lower left drawing of FIG. 6 illustrates a state where the engine ECU 130 maintains the wheel guard system 1 in a non-operation state in the initial mode. In this case, in the wheel guard system 1, the first and second flaps 30-1 and 30-2 of the speed rib 30 are piled on each other and are built in the flap protector 11 of the wheel guard 10, and thus tire alignment has not been formed with respect to the bumper 120.

In contrast, the lower right drawing of FIG. 6 illustrates a state where the engine ECU 130 has changed the wheel guard system 1 from a high-speed mode state to a full operation state. In this case, in the wheel guard system 1, the speed rib 30 is unfolded by the flap protector 11 of the wheel guard 10 through the rotation of the first flap 30-1 by 270° and the rotation of the second flap 30-2 by 180°, and thus the tire alignment with respect to the bumper 120 has been sufficiently formed.

Accordingly, the engine ECU 130 operates the wheel guard system 1 from the initial mode to the high-speed mode through the low-speed mode, and thus the aerodynamic improvement effect for the underbody and wheel/tire portion can be greatly heightened through the sufficient tire alignment by the speed rib 30 during high-speed driving of the vehicle 100.

As described above, the rotary shielding type wheel guard system 1 of the vehicle 100 according to this form is composed of the wheel guard 10 located on the upper portion of the tire 110, the speed rib 30 which is folded in a fan shape and is built in the wheel guard 10 by the folding in the rotation direction of the motor 40, and the dust cover 50 shielding the inlet portion of the wheel guard 10. Accordingly, the wheel guard system 1 maintains and improves the aerodynamic improvement effect for the underbody and wheel/tire portion by shielding the whole tire width through the tire alignment of the speed rib 30, and in particular, does not restrict the degree of freedom of bumper design by variably controlling the radial folding and unfolding portion of the speed rib 30 to suit the bumper side curvature size.

While the present disclosure has been described with respect to the specific forms, it will be apparent to those skilled in the art that various changes and modifications may be made without departing from the spirit and scope of the disclosure.

What is claimed is:

1. A wheel guard system for a vehicle, comprising:
   a wheel guard; and
   a deflector configured to be folded to enter into and to be built in the wheel guard and configured to be unfolded to get out of the wheel guard along a width direction of a tire and to form tire alignment for shielding a whole tire width during the vehicle is driving.

2. The wheel guard system according to claim 1, wherein the folding and unfolding of the deflector correspond to rotations in opposite directions.

3. The wheel guard system according to claim 1, wherein the wheel guard is provided with a flap protector, and the flap protector is configured to form a space in which the deflector is folded.

4. The wheel guard system according to claim 1, wherein the deflector is provided with a speed rib rotated by a motor, and the motor is configured to fold or unfold the speed rib in a rotation direction of the motor.

5. The wheel guard system according to claim 4, wherein the speed rib comprises a first flap configured to move by a rotation force transferred from the motor, and a second flap configured to move to the first flap, wherein a shape of the first flap and the second flap is changed from a fan shape to a semicircular shape by folding and unfolding the speed rib.

6. The wheel guard system according to claim 5, wherein the semicircular shape has a size to shield the whole tire width.

7. The wheel guard system according to claim 5, wherein the first flap and the second flap are formed in a fan shape.

8. The wheel guard system according to claim 5, wherein the first flap is provided with a flap projection projecting from the first flap, the second flap is provided with a flap groove caved to form a movement path of the flap projection, and
   wherein the second flap moves together with the first flap along the movement path.

9. The wheel guard system according to claim 8, wherein the movement path has the same radius as a rotation radius of the first flap.

10. The wheel guard system according to claim 4, wherein the deflector is provided with a dust cover configured to shield an inlet portion of the wheel guard, and the dust cover is coupled to the wheel guard by a spring hinge.

11. The wheel guard system according to claim 10, wherein the dust cover is configured to open the inlet portion in case where the spring hinge is flipped by a pressing force applied by the speed rib during the unfolding.

12. The wheel guard system according to claim 10, wherein the dust cover is configured to close the inlet portion by a spring restoring force of a spring applied to the spring hinge during the folding.

13. The wheel guard system according to claim 10, wherein a flap guide is provided on the inlet portion of the wheel guard, and the flap guide is configured to form the spring hinge so that the dust cover is coupled thereto.

14. The wheel guard system according to claim 13, wherein the flap guide projects along the inlet portion.

15. The wheel guard system according to claim 1, wherein the deflector is associated with a controller, and control modes of the controller include: an initial mode in which the deflector is in a folding state, a high-speed mode in which the deflector is in a full unfolding state, and a low-speed mode in which the deflector is in a half unfolding state.

16. A vehicle comprising:
   a wheel guard system including:
      a wheel guard located on an upper portion of a tire of the vehicle;
      a speed rib configured to:
         be folded in a fan shape by folding in a rotation direction of a motor and to be built in the wheel guard, and
         be unfolded in a semicircular shape and get out of the wheel guard, and
      a dust cover configured to shield an inlet portion of the wheel guard; and
   a bumper configured to shield a partial portion of the tire with left and right bumper side curvatures.

17. The vehicle according to claim 16, wherein the wheel guard system is associated with an engine electronic control unit (ECU), and the engine ECU is configured to control the folding and unfolding of the speed rib in the rotation direction of the motor.

18. The vehicle according to claim 17, wherein the engine ECU is configured to control the folding and unfolding of the speed rib based on an initial mode, a low-speed mode, and a high-speed mode, and
   wherein the initial mode, the low-speed mode, and the high-speed mode are determined by a speed of the vehicle.

19. The vehicle according to claim 18, wherein the speed rib is built in the wheel guard in a folding state in the initial mode, the speed rib is configured to get out of the wheel guard in a half unfolding state by shielding a half width of the tire in the low-speed mode, and the speed rib is configured to get out of the wheel guard in a full unfolding state by shielding a whole width of the tire in the high-speed mode.

20. The vehicle according to claim 18, wherein the vehicle speed is detected by a vehicle speed sensor.

* * * * *